June 1, 1926.
A. VIERS
FISHING ROD
Filed August 4, 1925
1,587,446
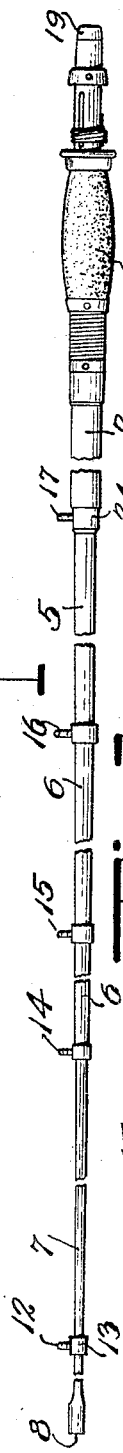
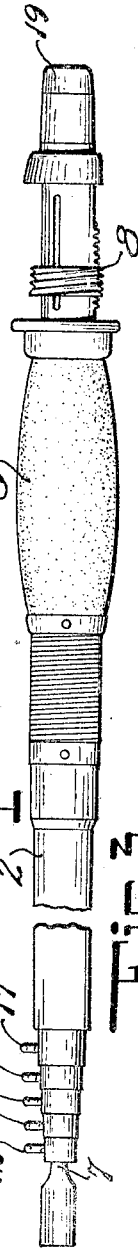
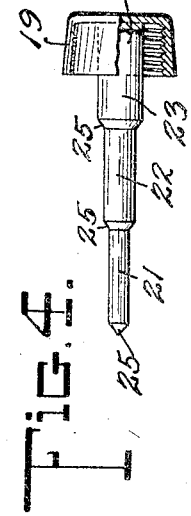
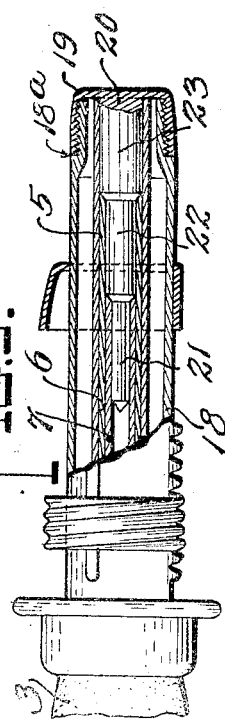
Inventor
A. Viers
By Robb, Robb & Hill
Attorneys Patented June 1, 1926.

1,587,446

UNITED STATES PATENT OFFICE.

ARTHUR VIERS, OF RED LODGE, MONTANA.

FISHING ROD.

Application filed August 4, 1925. Serial No. 48,051.

This invention relates to a fishing rod, and particularly to a construction comprising telescoping extensible sections.

In this type of fishing pole or rod the telescoping sections when free for contact with each other frequently become wedged when nested within the handle section and shift therein, producing noise and sometimes injury. To avoid such objections a supporting post has been provided at the handle section having surfaces to frictionally engage and retain each of the extensible sections so that they are held when nested in proper relation to each other and are readily withdrawable. Furthermore such a construction permits the withdrawal of one or more of the sections to form a rod of the desired length while the remaining sections are supported by the post.

It has also been found that when the fishing line guides upon the extensible sections are all slidingly mounted they become readily displaced in their relative positions when the rod sections are withdrawn for use. I have therefore provided for a fixed or rigid mounting of the alternate line guides while the intermediate guides are slidable upon the tapering sections. In casting the line a serious difficulty frequently occurs by reason of the formation of a half-hitch at the end of the rod requiring the manual releasing thereof. This has been avoided by the provision of an improved tip having an aperture through which the line is passed so that its free end issues from the rod at the axial center thereof.

The invention has for an object to provide a novel and improved construction in which the telescoping tubular sections are separately supported upon corresponding surfaces of a post or similar device mounted upon the handle section of the fishing rod.

A further object of the invention is to provide a new structure of support for the nested tubular sections comprising a cap adapted to be secured to the handle section and carrying a post having a longitudinal series of friction surfaces disposed to be surrounded by the inner ends of the extensible sections to firmly support them in fixed relation to each other.

Another object of the invention is to present an improved arrangement of fishing line guides upon the tapering extensible sections comprising the provision of alternate fixed guides and slidably mounted guides upon the successive sections whereby they will be properly positioned by the taper of the sections when extended and closely assembled when the sections are nested.

Other and further objects and advantages of the invention will be hereinafter set forth and the novel features thereof defined by the appended claims.

In the drawing:—

Figure 1 is a partially extended elevation of the rod, with parts broken away;

Figure 2 is an enlarged elevation with the sections nested;

Figure 3 is a detail section of the handle;

Figure 4 is an elevation of the supporting post, with parts in section;

Figure 5 is a top plan of the rod tip;

Figure 6 is a longitudinal section of the same; and

Figure 7 is a similar view of a modified form of tip.

Like numerals designate like parts throughout the several figures of the drawing.

In the form of the invention shown the numeral 2 designates the handle or enclosing section which is provided with a grip 3 of the usual character. This section is adapted to enclose a series of extensible sections, which may be varied in number, and in the present instance comprise a base section 4, a second section 5, a third section 6, and a tip section 7 which telescope within each other. The enlarged open end 8 of the tip section 7 permits the axial location of the fishing line 9 by passing the same through an opening 10 in a wall of the section. This axial exit of the line from the rod tip prevents the hitching of the line thereon when casting and permits a free feed thereof.

A modified form of this tip section is shown in Figure 7 wherein the section 7$^a$ is formed with a side aperture 10$^a$ for the entrance of the line 9 and an end opening 8$^a$ for the passage of the free end of the line.

The line 9 is passed through a series of guides upon the extensible sections and these comprise a guide 12 slidably mounted upon the section 7 by a collar 13, a fixed guide 14 secured to the section 6 and a second slidable guide 15 thereon; a fixed guide 16 upon the section 5 and a further sliding guide 17 thereon having a collar or ferrule 24 adapted to seat in the end of the handle section 2. The line after passing through these several guides is connected to the usual reel secured by the portion 18 of the handle section.

The butt or free end of this portion 18 is exteriorly threaded at 18ª and adapted to receive a cap member 19 which closes the end of the rod and is interiorly threaded to engage the end 18ª. Projected centrally from the cap is a supporting post 20 having a series of concentrically disposed faces 21, 22 and 23 of successively different diameter to frictionally fit within the inner end of the extensible section to firmly hold them in relative position when nested. The receiving end of the faces is formed with an inclined wall 25 to guide the sections into position thereon. The section 5 tightly fits the cylindrical face or step 23, the section 6 the portion 22, and the section 7 the face 21. This retains these sections so that they resist displacement in handling the rod and require some tension for their withdrawal. One or more of the held sections may be withdrawn to form a rod of the preferred length. The section 5 may be held against movement at the outer end of the handle by the slide collar 4 fitting therein, which may also be used to hold the section at varied degrees of extension of its cooperation with the taper of the section 5.

The operation of the invention will be obvious from the foregoing description from which it will be seen that a fishing rod is produced of reduced size and weight and readily extensible to the desired length to be used, while when nested the sections are separately held by the post against movement within the handle section or wedging together. The taper of these sections causes the sliding line guides thereon to move to approximately the middle of the section where they are held in position.

While the details of the invention have been specifically shown and described, still it is not confined thereto as changes and alterations may be made without departing from the spirit thereof as defined by the following claims.

Having thus described my invention, what I claim as new and desire to secure by Letters Patent is:—

1. In a fishing rod, a handle section, a series of telescoping tubular sections adapted to be nested therein, and means carried by the handle section for fitting within and separately supporting the nested sections.

2. In a fishing rod, a handle section, a plurality of tubular telescoping sections adapted to be nested therein, and a support for said sections secured to the handle section and having separate faces to frictionally engage the telescoping sections.

3. In a fishing rod, a handle section, a plurality of tubular telescoping sections adapted to be nested therein, and a cap mounted upon the handle and having a post with concentric faces to enter and frictionally retain the nested sections.

4. In a fishing rod, a handle section, a plurality of tubular telescoping sections adapted to be nested therein, a cap mounted upon the handle and having a post with concentric faces to enter and frictionally retain the nested sections, and inclined walls provided at the receiving end of said faces.

5. In a fishing rod, a handle section, a plurality of tubular telescoping sections adapted to be nested therein, and a cap threaded upon the handle section and having a central post with cylindrical faces of successively reduced diameter to separately fit and retain the nested sections.

6. In a fishing rod a handle section, a plurality of tubular telescoping sections, and a supporting member carried by the handle section and having a plurality of separate faces in longitudinal succession and of a diameter to closely fit within the telescoping sections when nested.

In testimony whereof I affix my signature.

ARTHUR VIERS.